United States Patent
Maistre et al.

(10) Patent No.: US 6,867,565 B2
(45) Date of Patent: Mar. 15, 2005

(54) PROCESS FOR LEARNING THE LIMITS OF TRAVEL OF A ROLLER BLIND ACTUATOR

(75) Inventors: Valérie Maistre, Thyez (FR); Jean-Pierre Cathala, Burdignin (FR)

(73) Assignee: Somfy, Cluses (FR)

(*) Notice: Subject to any disclaimer, the term of this patent is extended or adjusted under 35 U.S.C. 154(b) by 0 days.

(21) Appl. No.: 10/436,237

(22) Filed: May 12, 2003

(65) Prior Publication Data

US 2003/0210008 A1 Nov. 13, 2003

(30) Foreign Application Priority Data

May 13, 2002 (FR) .............................................. 02 05860

(51) Int. Cl.[7] .................................................. H02P 7/00
(52) U.S. Cl. ....................... 318/468; 318/466; 318/265; 318/266
(58) Field of Search ................................ 318/466, 468, 318/265, 266

(56) References Cited

U.S. PATENT DOCUMENTS

| | | | | |
|---|---|---|---|---|
| 5,225,748 A | * | 7/1993 | Haring | 318/266 |
| 5,270,629 A | | 12/1993 | Hsieh | 318/600 |
| 5,278,480 A | * | 1/1994 | Murray | 318/626 |
| 5,929,580 A | * | 7/1999 | Mullet et al. | 318/466 |
| 6,100,659 A | * | 8/2000 | Will et al. | 318/466 |
| 6,259,218 B1 | * | 7/2001 | Kovach et al. | 318/16 |

FOREIGN PATENT DOCUMENTS

| | | |
|---|---|---|
| EP | 0 426 577 A1 | 5/1991 |
| EP | 0 671 676 A1 | 9/1995 |
| EP | 0 967 360 A1 | 12/1999 |
| FR | 2 737 318 | 1/1997 |
| FR | 2 808 835 | 11/2001 |

* cited by examiner

Primary Examiner—Rita Leykin
(74) Attorney, Agent, or Firm—Frommer Lawrence & Haug LLP; Ronald R. Santucci

(57) ABSTRACT

The process contains the following steps:
- entering a teaching mode,
- defining and recording zero, one or two limit of travel positions,
- exiting the teaching mode,
- determining the number and the type of the limits of travel produced by end stops,
- if there exists at least one limit of travel produced by virtue of an end stop, detecting and recording the position of the end stops.

10 Claims, 2 Drawing Sheets

PROCESS FOR LEARNING THE LIMITS OF TRAVEL OF A ROLLER BLIND ACTUATOR

This application claims priority benefits of French Patent Application Number 02 05860 filed May 13, 2002.

BACKGROUND OF THE INVENTION

The invention pertains to a process for teaching the limits of travel of an electric actuator intended for maneuvering movable products for solar protection, for shading or for closure. The invention also relates to a device allowing the implementation of the teaching process.

Patents relating to devices or processes for teaching the limits of travel exist in the prior art.

DESCRIPTION OF THE PRIOR ART

French patent FR 2 743 602 relates to a motorized closure or solar protection installation. In this patent, the existence of two end stops, top and bottom, is assumed. The aim is to distinguish these stops from an obstacle or else from a defect such as a hard point in a slideway. The use of a bidirectional counter (incrementation decrementation) is proposed in association with a means for measuring variations in speed or in torque. The teaching process described exploits the existence of end stops but there is no specific indication of the bottom position by the installer.

In French patent FR 2 754 117 pertaining to a roller blind or shutter control device, the existence of two end stops is likewise assumed.

The procedure described is that of an automatic sequence aimed at assigning the right direction of motor rotation in response to an order given from the control point. In the course of this procedure, the product starts automatically on encountering the first and then the second stop. A comparison of the journey times is made, and the position of the stops is possibly recorded automatically. The teaching process used therefore exploits the existence of end stops. There is no specific indication of the bottom position by the installer.

French patent FR 2 780 089 describes a roller blind drive motor control device. This patent addresses the desire to produce an automatic adjustment device making it possible to identify the bottom position, and the nature of the link between the actuator (or the winding tube) and the blind. For this purpose, the device comprises at least means of fine analysis of variations in the motor torque. These means comprise at least one sensor for example a sensor of "micro-displacements" and an analog/digital converter. FIG. 2 of this patent clearly shows the type of analysis of variations in torque necessary, and therefore the accuracy of the measuring device. The application of the algorithms presented in this patent is therefore necessarily expensive. There is no specific indication of the bottom position of the roller blind by the installer.

French patent FR 2 790 787 pertains to a device for detecting the termination of stacking of the slats of a roller blind. This patent describes more particularly the difficulties in detecting termination of stacking of the slats of a roller blind when dealing with wind-up slats. As before, the torque detection is carried out by means of a sensor responsive to "micro-displacements". The termination of stacking is detected by the closing of an angular clearance. Despite its advantages, this invention therefore requires both the above sensor and its processing electronics, and also a specific mechanical setup for creating the angular clearance. There is no specific indication of the bottom position of the blind by the installer.

French patent application FR 2 808 835 presents the particular feature of proposing a process of adjustment in which a second limit of travel is stored implicitly after the first limit of travel has been stored, either automatically (in the case of an end stop), or through a manual procedure. Therefore, in the case (cf. page 9 line 27) of a product exhibiting a single end stop allowing automatic adjustment (for example top stop), the process according to this application would require the installer to:

activate the automatic mode of adjustment and send the product to its end stop by pressing the up button, until the automatic recording of the top limit of travel position is triggered.

to take command by controlling the product until it is brought to its desired bottom position, to send the product back to the top stop, this maneuver having the aim of recording the bottom position.

It appears that this "non-automatic" way of recording the position is surprising and sufficiently contrary to intuition as to confuse installers and cause a loss of time on work sites. Moreover, this process prevents a fast installation procedure since it obliges the installer to trigger the automatic recording of the stop before repositioning the product on the stopless position.

When installing an actuator driving a solar protection, shading or closure product, three types of configurations are encountered:

the product exhibits two end stops, the product exhibits one end stop, the product exhibits no end stop.

The abovedescribed processes for teaching the limits of travel are not suitable for all these types of configurations. Consequently, the process for teaching the actuator must be programmed as a function of the number of end stops possessed by the product, or one and the same non-automatic teaching process where the installer indicates the limits of travel positions must be used for all the products, even if the product exhibits end stops.

SUMMARY OF THE INVENTION

The aim of the invention is the implementation of a process for teaching the limits of travel alleviating this problem and improving the known processes of the prior art. In particular, the invention proposes to implement a process for teaching the limits of travel which is suitable for all the configurations encountered.

The teaching process according to the invention is characterized by the characterizing part of claim 1.

The dependent claims 2 to 6 define various modes of execution of the process.

The device for the implementation of the process is characterized by the characterizing part of the dependent claim 7.

The appended drawing represents, by way of example, a mode of execution of the process according to the invention.

DESCRIPTION OF THE PREFERRED EMBODIMENTS

Figure 1:
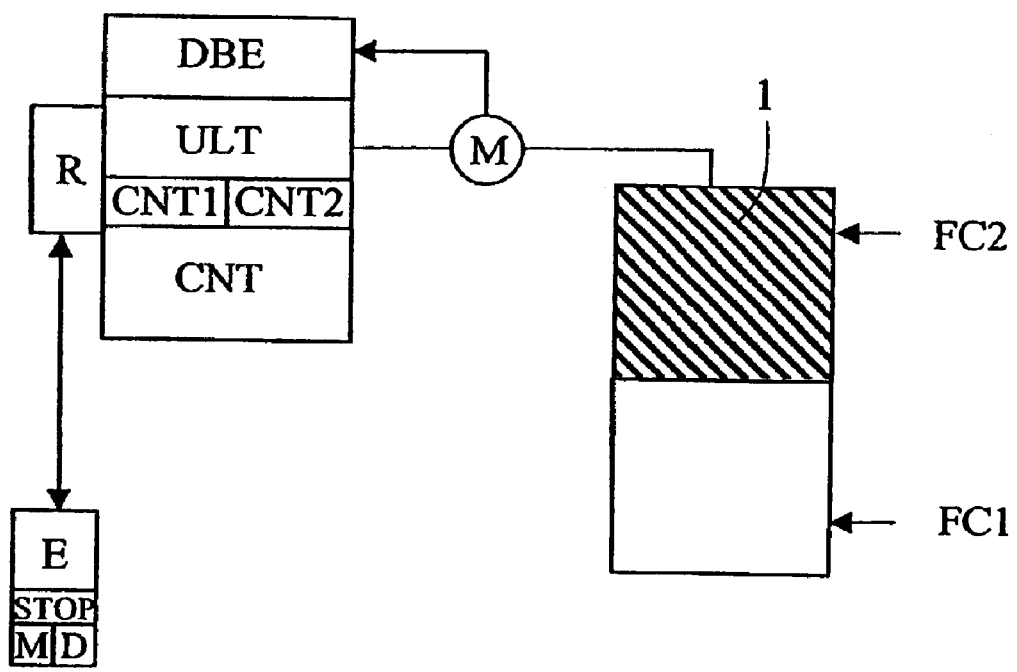
FIG. 1 is a block diagram of an actuator actuating a product and of a remote control, allowing the execution of the process according to the invention.

The process according to the invention is applied to the case of a roller blind 1 moving vertically. The block diagram of a device allowing the implementation of the process according to the invention is described firstly with reference to FIG. 1. The power supply to the device is not represented. This device comprises a transmitter E, a receiver R, these two elements forming a control member E/R, a logic processing unit ULT associated with a counter CNT with incrementation decrementation (according to the direction of control of the actuator) whose particular values can be stored either on the basis of the E/R control, or on the basis of the signal from a stop detector DBE in memories referred to as the bottom limit of travel memory CNT1 and the top limit of travel memory CNT2. Of course, the actuator also comprises a motor M which actually drives the moving product controlled by the processing unit ULT. Such logic processing units are known in the state of the art. The control member consists for example of a transmitter of radio orders and of a receiver of radio orders. The link may be bidirectional so as to benefit from information feedback or from an authentication dialogue. Any wire or wireless process may be suitable, provided that the transmitter E contains means for defining and for addressing control orders. In a simple case, the transmitter E contains a keypad with three buttons: up M, down D and halt STOP. As is known from the prior art, one and the same button may be assigned several functions depending on the time for which it is pressed and/or depending on whether or not it is used in combination with other buttons.

The process according to the invention makes it possible to determine the limits of travel (top limit of travel and/or bottom limit of travel) produced by virtue of end stops and to record in the memories CNT1 and CNT2 the positions of the latter automatically.

Figure 2:
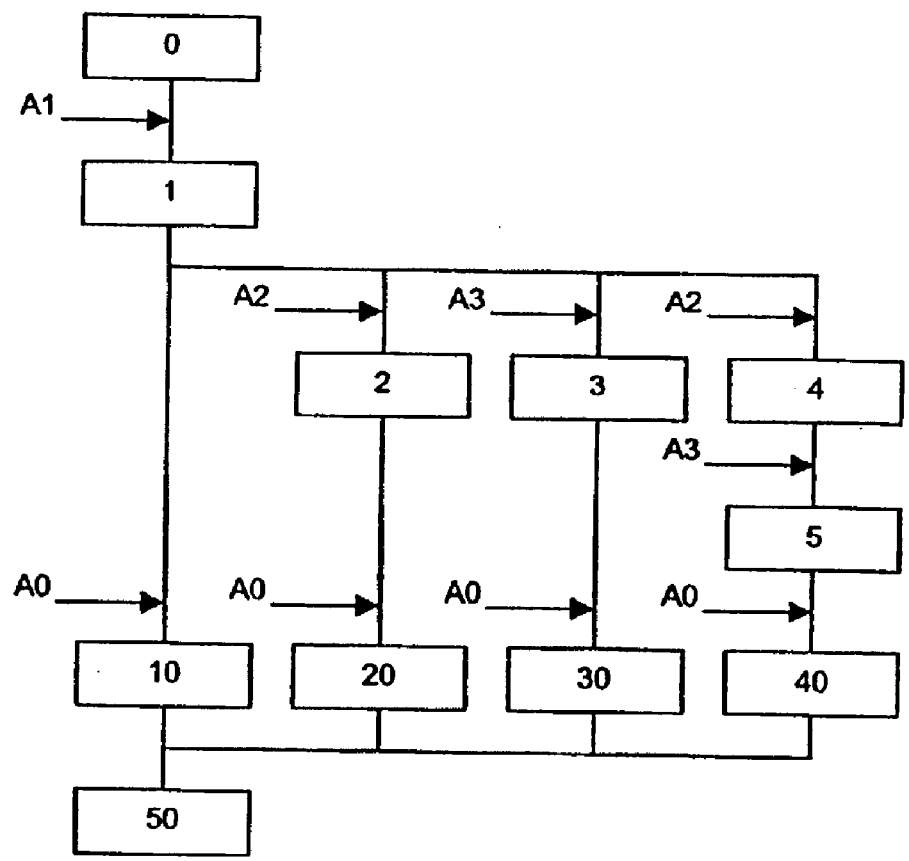
FIG. 2 is a flowchart representing the various steps of the process according to the invention.

FIG. 2 represents the various steps of the process according to the invention. The four vertical branches of the flowchart correspond to the four configurations encountered: the blind exhibits two end stops, the blind exhibits a single end stop at the top, the blind exhibits a single end stop at the bottom and the blind exhibits no end stop. An initial step 0 is triggered for example by switching on the actuator which has just been installed in the product which it drives, for example a roller blind. The logic processing unit ULT is then placed in a standby mode awaiting orders. In this initial step it is entirely possible to permit up or down orders to be executed, provided, however, that they are given in the form of pressure maintained on the control buttons M or D of the transmitter E. Such a precaution is necessary so as to prevent the motor from being activated ill-advisedly, that is to say activated through a stored pulse command although there has been no adjustment of the limits of travel.

In step 1, the installer has activated the teaching mode. For example, he has pressed simultaneously on the Up and Down buttons of the transmitter E. This command is represented in FIG. 2 by the arrow A1. The logic processing unit ULT is programmed to recognize such a command. It then activates a program for waiting and for executing a record limit of travel order and/or for waiting and for executing an exit teaching mode order. The logic processing unit ULT can also activate a program for waiting and for executing a move order and/or a program for waiting and for executing a permanent change of motor direction order (for example if the installer notes that the M button of the transmitter triggers a down movement of the blind 1 and the D button of the transmitter triggers an up movement of the blind 1 owing to its direction of setup). Exit from the teaching mode is effected by a specific command represented by the arrow A0. Nothing prevents the same command being used to exit this mode as to enter it. From an ergonomic point of view, a more intuitive action will be preferred, for example maintained pressing of the STOP button for more than two seconds, although the product has already come to a halt.

A command for designating and for recording bottom limit of travel position is represented by the arrow A2, while a command for recording top limit of travel is represented by the arrow A3.

To designate and record a bottom limit of travel position, one may decide that it is necessary to press the STOP and Down buttons simultaneously, this button implicitly designating the bottom. One may equally well decide that it is necessary to press the STOP and Up buttons, since one may foresee that an up movement will follow immediately. It is of course a matter of convention, or of complying with habits already formed in this type of installation.

If the installer commands exit from the teaching mode although he has not triggered any record limit of travel command as represented in the flowchart of FIG. 2 in the first vertical branch starting from the left, we go to step 10. In this step, the program contained in the processing unit ULT deduces from the previous commands activated by the installer that the actuator is associated with a blind 1 exhibiting two end stops. We then go to step 50 which will be described later in this text. It is observed that no maneuvering whatsoever of the product has been necessary in order to reach the stops in this phase of configuration.

In the second branch of the flowchart, the installer commands the designation and the recording of a bottom limit of travel position FC1, after having operated the motor M so as to reach such a position of the blind. This action is represented by the arrow A2, and it activates step 2 for storing the content of the position counter CNT in the memory CNT1. The installer than gives the order represented by the arrow A0 to exit the teaching mode. This activates step 20. In this step, the program contained in the processing unit ULT deduces from the previous commands activated by the installer that the actuator is associated with a blind 1 exhibiting a single end stop: the top stop. We then go to step 50. It is observed that no maneuvering whatsoever of the product has been necessary in order to reach the top stop in this phase of configuration.

The situation is reversed in the third branch of the flow chart, in which it is the top limit of travel position FC2 which is defined and recorded. This action is represented by the arrow A3, and it activates step 3 for storing the content of the position counter CNT in the memory CNT2. The installer then gives the order represented by the arrow A0 to exit the teaching mode. This activates step 30. In this step, the program contained in the processing unit ULT deduces from the previous commands activated by the installer that the actuator is associated with a blind 1 exhibiting a single end stop: the bottom stop. We then go to step 50. It is observed that no maneuvering whatsoever of the product has been necessary in order to reach the bottom stop in this phase of configuration.

Finally, the fourth branch of the flowchart describes the situation where the installer successively performs a command for designating and for recording a bottom limit of travel position represented by the arrow A2, followed by a top limit of travel position represented by the arrow A3, this triggering the passage to steps 4 and 5, functionally identical to steps 2 and 3. Of course, the sequence of recording of the positions of the limits of travel could have been reversed, commencing firstly with the top limit of travel position.

The installer then gives the order represented by the arrow A0 to exit the teaching mode. This activates step 40. In this step, the program contained in the processing unit ULT deduces from the previous commands activated by the installer that the actuator is associated with a blind 1 exhibiting no end stop. We then go to step 50.

In step 50, the fast commands, of stored pulse type, become validated by the logic processing unit, since the positions of the limits of travel are henceforth either known, or detectable from end stops. This signifies for example that a brief depression of the Up push button M is interpreted by the processing unit as an up order to rise until reaching either the top stop or the top limit of travel position FC2 previously recorded In the case where at least one end stop exists, the detection of the position of the upper end stop and the recording of the position of the blind corresponding to contact against this end stop are effected when an up order is given and/or the detection of the position of the lower end stop and the recording of the position of the blind corresponding to contact against this end stop are effected when a down order is given.

In the case where the top halt occurs on an end stop, the corresponding position can be stored as limit of travel position, possibly with an offset making it possible to avoid invoking this stop again during the following maneuvers. This type of teaching is known in the state of the art, and likewise it is known to periodically reupdate this recording so as to take account of any drifting or deformation of the kinematic chain. Finally, if the characteristics of the motor and/or of its supply so permit, it is possible to envisage operation at reduced torque so long as the stops have not been marked.

For simplicity, this subsequent marking of the stops is here represented in step 50, but it is clear that it may take place in any subsequent step of the life of the product, even after the delivery of the installation to its future user: it is simply a matter of exploiting the first detection of stop so as to carry out the storage of the corresponding limit of travel position.

Finally, as has been mentioned, it is clear that it is not indispensable, in the process described, to explicitly designate the top (or bottom) limit of travel as such. It is possible for example simply to use a specific command for teaching limit of travel, while leaving the processing unit the job of determining whether it is a top limit of travel (because the previous movement responded to an up order) or a bottom limit of travel (because the previous movement corresponded to a down order).

The invention can be applied in the same way to any actuator intended to be mounted on moving products for closure, shading or solar protection. The movement of these products in space may equally well be horizontal, inclined or vertical.

What is claimed is:

1. A process for learning limits of travel of an electric actuator intended for maneuvering a movable product for solar protection, for shading or for closure, said process comprising the steps of:
   entering a learning mode,
   defining zero, one or two limit of travel positions, and a type of travel position: bottom limit of travel or top limit of travel,
   recording the limit of travel positions as a function of type in memories referred to as a bottom limit of travel memory and a top limit of travel memory,
   exiting the learning mode,
   using previous recordings located in the memories to determine a number and a type of the limits of travel produced by end stops, and
   if there exists at least one limit of travel produced by an end stop, then the position of the end stop is detected and recorded as the limit of travel position.

2. The process as claimed in claim 1, further comprising the steps of:
   reaching the end stop, by control of the electric actuator,
   determining the type of the limit of travel position produced by the end stop, the type of the limit of travel position being produced by the end stop as a function of the control of the electric actuator and,
   recording the position of the end stop.

3. The process as claimed in claim 1, wherein the defining step further comprises zero, one or two iterations of the following steps:
   activating the electric actuator so as to bring the movable product to a limit of travel position, and
   designating, through a specific command, the limit of travel position as being a top limit of travel position or a bottom limit of travel position.

4. The process as claimed in claim 1, wherein the defining step further comprises zero, one or two iterations of the following steps:
   activating the electric actuator so as to bring the movable product to a limit of travel position,
   designating, through a specific command, the limit of travel position as being a limit of travel position, and
   using the information regarding direction of actuation of the movable product prior to the designating step to determine whether one is dealing with a bottom limit of travel position or with a top limit of travel position.

5. The process as claimed in claim 1, wherein the defining step further comprises zero, one or two iterations of the following steps:
   activating the electric actuator so as to bring the movable product to a limit of travel position,
   designating, through a specific command, the limit of travel position as being a limit of travel position,
   activating the electric actuator so as to direct the movable product toward the other limit of travel position, and
   using information regarding direction of actuation of the movable product in the designating step to determine whether the previously designated limit of travel position is a bottom limit of travel position or a top limit of travel position.

6. The process as claimed in claim 1, wherein operation of a motor is effected at reduced torque until limits of travel positions have been recorded.

7. A device for the implementation of the process as claimed in claim 1, said device comprising at least a transmitter, a receiver linked the electric actuator comprising a motor acting on the movable product, a counter, and a logic processing unit associated with at least the two memories, whose stored values correspond to values of the counter identifying limits of travel position of the movable product and a detector detecting the end stops.

8. The process as claimed in claim 2, wherein the defining step further comprises zero, one or two iterations of the following steps:
   activating the electric actuator so as to bring the movable product to a limit of travel position; and
   designating, through a specific command, the limit of travel position as being a top limit of travel position or a bottom limit of travel position.

9. The process as claimed in claim 2, wherein the defining step further comprises zero, one or two iterations of the following steps:

activating the electric actuator so as to bring the movable product to a limit of travel position, designating, through a specific command, the limit of travel position as being a limit of travel position, and using information regarding direction of actuation of the movable product prior to the designating step to determine whether one is dealing with a bottom limit of travel position or with a top limit of travel position.

10. The process as claimed in claim 2, wherein the defining step further comprises zero, one or two iterations of the following steps:

activating the electric actuator so as to bring the movable product to a limit of travel position, designating, through a specific command, the limit of travel position as being a limit of travel position, activating the electric actuator so as to direct the movable product toward the other limit of travel position, and using information regarding direction of actuation of the movable product in the designating step to determine whether the previously designated limit of travel position is a bottom limit of travel position or a top limit of travel position.

* * * * *